United States Patent Office 3,432,054
Patented Mar. 11, 1969

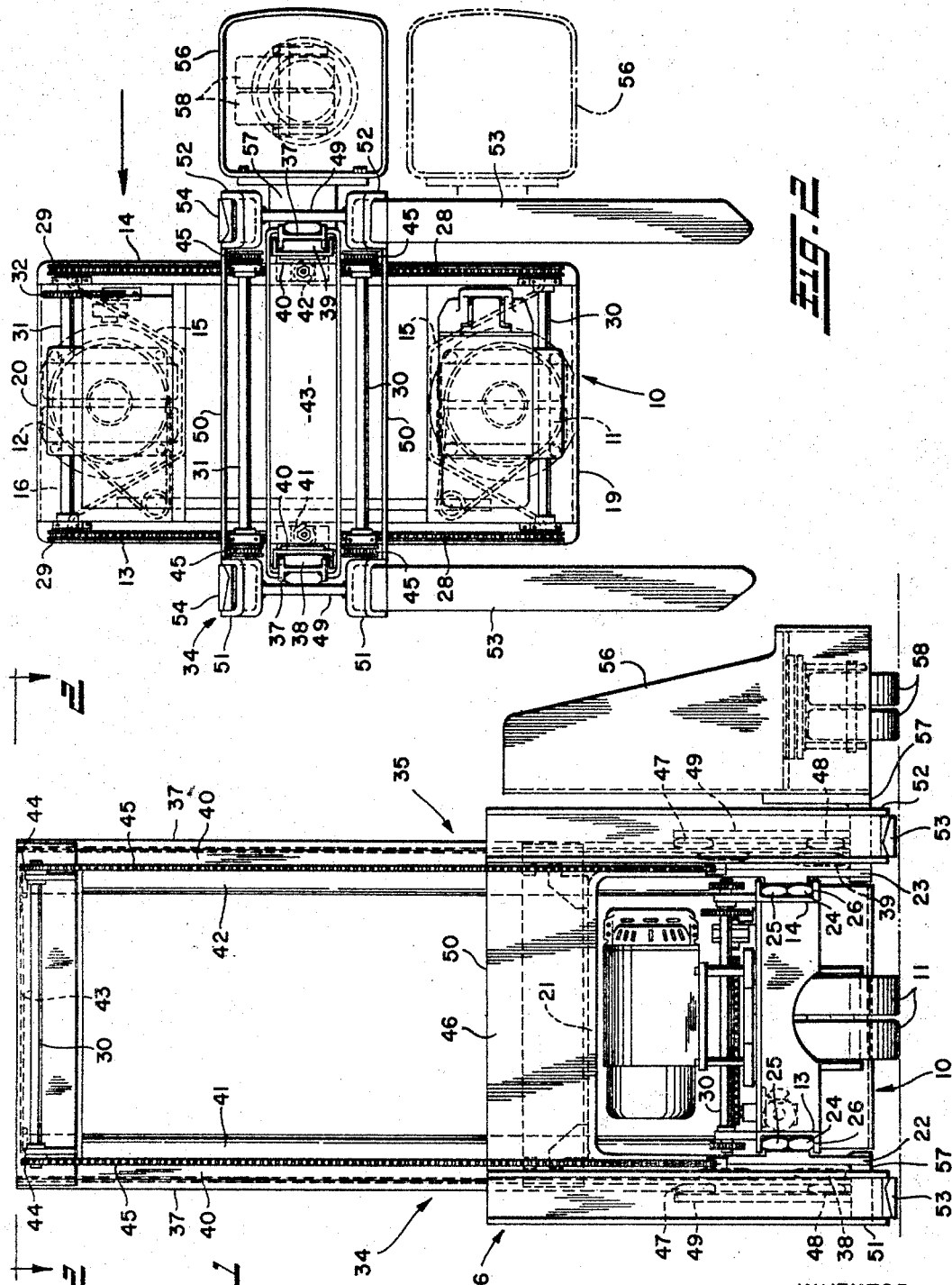

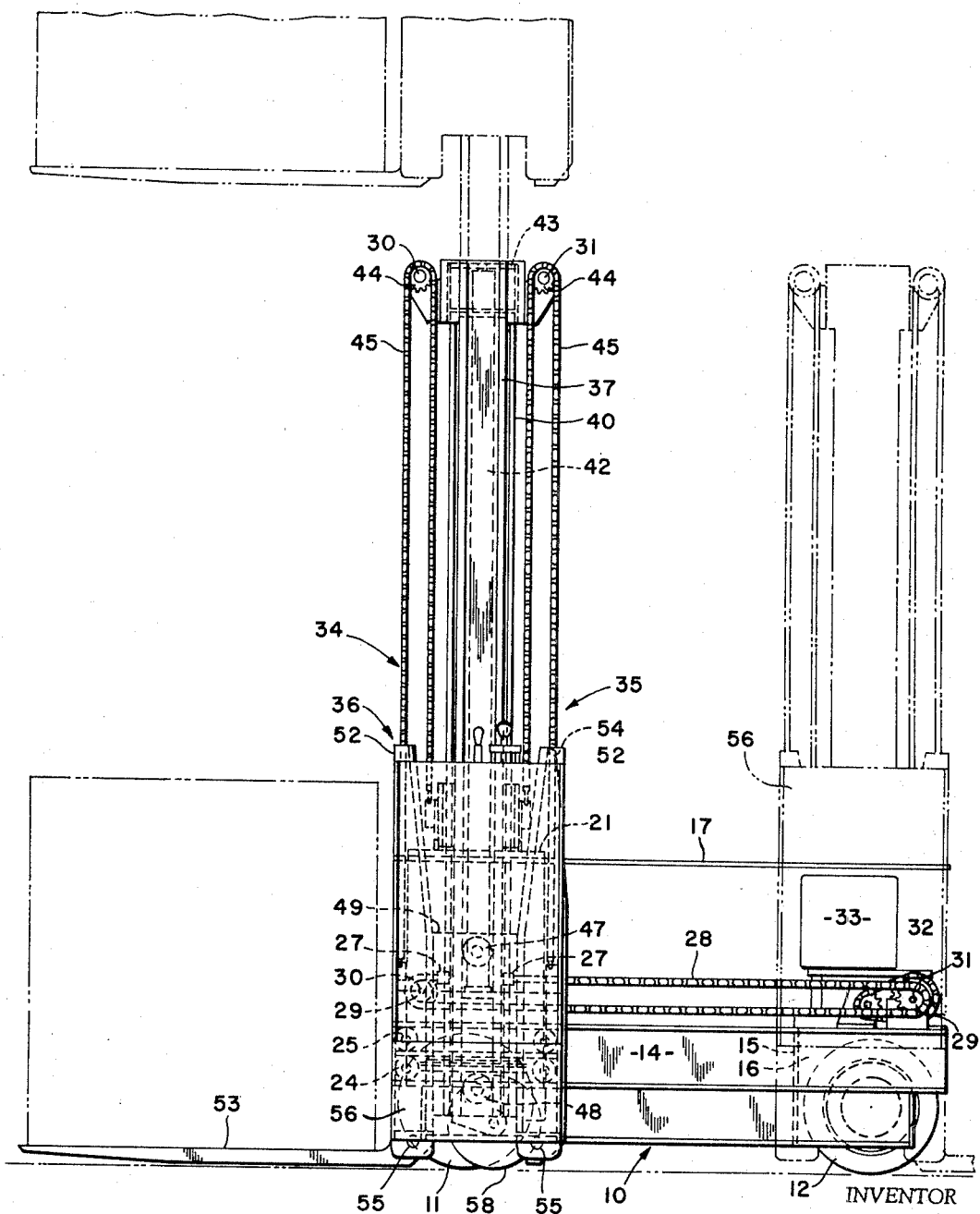

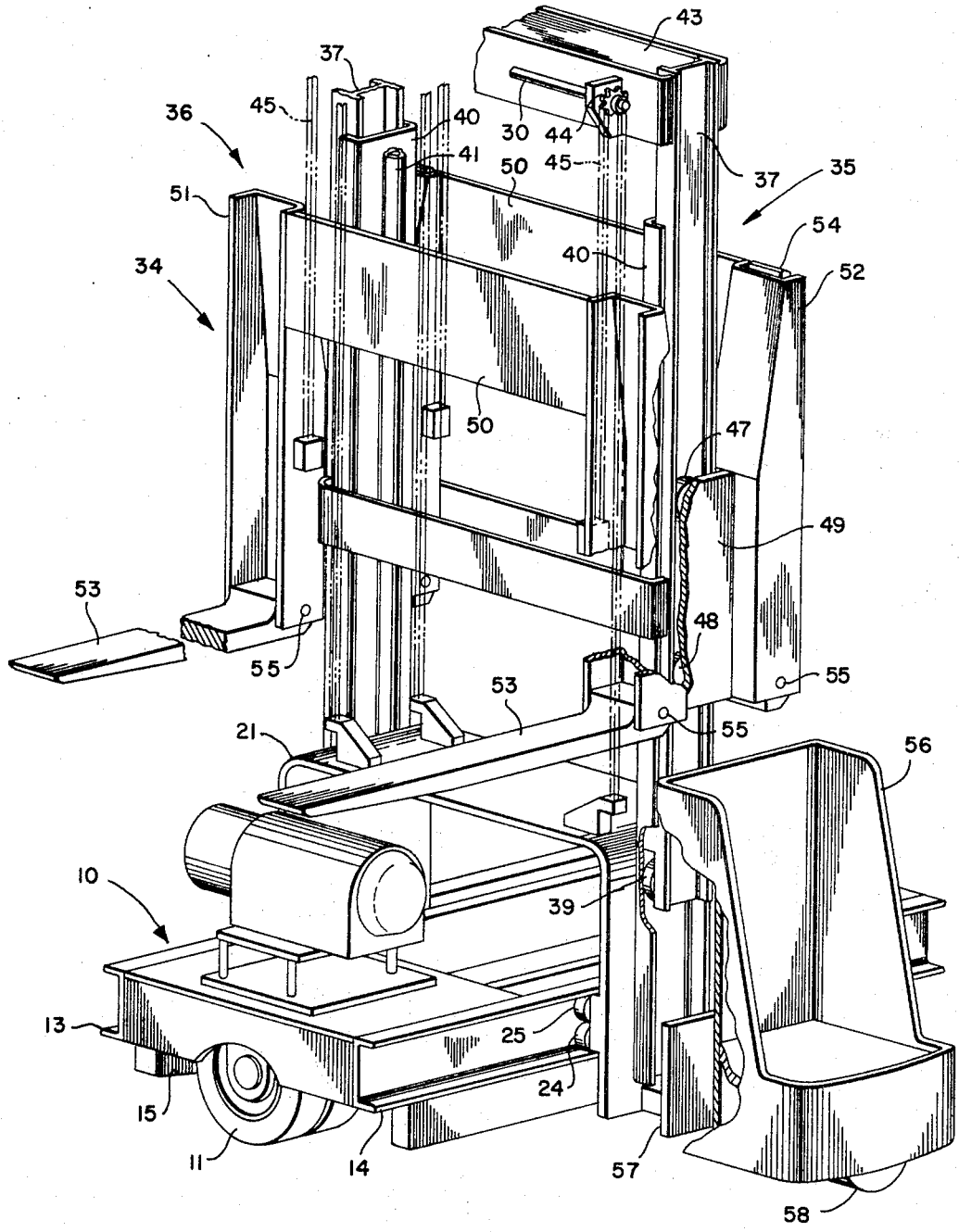

3,432,054
SIDE LOADING INDUSTRIAL TRUCK
Bronislaus I. Ulinski, Jenkintown, Pa., assignor to Eaton Yale & Towne Inc., Cleveland, Ohio, a corporation of Ohio
Filed Feb. 15, 1967, Ser. No. 616,271
U.S. Cl. 214—670
Int. Cl. B66f 9/18; B65g 37/00
8 Claims

ABSTRACT OF THE DISCLOSURE

A lift truck having a load lifting mechanism straddling the body of the truck and movable in a direction transverse to the usual direction of travel of the truck to accommodate loads of greater width. Additionally, the lifting mechanism includes a load carriage or forks at both sides thereof to permit a load to be handled at opposed sides of the truck without maneuvering the truck.

---

This invention relates to a lift truck adapted to lift or lower a load positioned along the side of the truck by a lifting means movable transversely relative to the usual direction of travel of the truck. Such lift trucks are known as "side loading" or simply "side" lift trucks.

Trucks of this type are useful in handling articles which are stacked along relatively narrow aisles so that a load can be picked up or deposited from the side of the truck without necessitating turning or maneuvering of the truck.

The present invention is directed particularly to a side lift truck of the type incorporating a load lifting mechanism having vertical uprights and a load carriage mounted for vertical movement on the uprights. The purpose of the invention is to provide a side lift truck of this type which is of simple construction, is more stable, and may accommodate wider loads.

To this end, the body of the truck is made without any vertical obstructions and the body is of lesser dimension in a direction parallel to the usual direction of travel than the dimension normal to the direction of travel. The load lifting mechanism straddles the body and is movable relative to the body in a direction transverse to the usual direction of the travel of the truck and thus, loads of considerably greater width may be accommodated.

In addition, the load lifting mechanism is provided with a load carriage, or forks, at both sides of the uprights to permit a load to be picked up and deposited with respect to the opposed sides of the truck and without turning and maneuvering the truck.

As a further feature of the invention, a novel arrangement of a platform for the operator is provided, such that the operator's platform is movable with the load lifting mechanism to not only additionally stabilize the truck but to provide optimum visibility and safety for the operator.

Other objects and avantages of this invention will be apparent in view of the description that follows.

In the drawings:
FIGURE 1 is a side elevational view of the improved industrial truck.
FIGURE 2 is a top plan view of the improved industrial truck.
FIGURE 3 is a rear elevational view of the improved industrial truck.
FIGURE 4 is a perspective view of the improved industrial truck showing the load carriage in elevated position with parts broken away and omitted.

Referring to the drawings, and in particular to FIG. 1, the improved industrial truck includes a main body unit 10 which is preferably of rectilinear or box shaped construction and supported by two or more wheels 11 and 12 on which the truck is adapted to move. The body 10 also serves to carry the drive motor, batteries, fluid pump and the necessary controls for operation of the truck, but as these details form no part of the present invention, they are not described in detail.

The particular truck illustrated in the drawings is intended for manual operation by an operator riding on the truck. It will be appreciated, however, that the invention is equally applicable to trucks which are remotely controlled. The main body unit 10 is formed by elongated parallel frame members 13 and 14 connected by end plates 15 which form a well 16 utilized for batteries, fuel tanks, etc. Outwardly of the plates 15 are wells for the wheels 11 and 12. The length of the members 13 and 14 determines the overall length of the body unit 10 in a direction normal to the usual direction of travel of the truck indicated by the arrow in FIG. 2. The dimension of the truck body, as measured in the direction normal to the usual direction of travel of the truck, is less than the dimension of the body as measured in the direction parallel to the usual direction of travel. A cover plate 17 encloses the body unit and provides an unobstructed upper surface 17 extending from the side 19 to the side 20 of the body unit.

An inverted U-shaped support member 21 straddles the body unit 10 and each of the legs 22, 23 thereof are provided with spaced sets of rollers 24 and 25 which cooperate with a track 26 formed in each of the members 13 and 14. The ends 27 of a pair of chains 28 are connected to the support member 21 for driving the support member reciprocally along the tracks. Each of the chains passes around sprockets 29 secured to shafts 30 and 31. Shaft 31 is driven by a chain 32 powered by a motor 33. Thus, the support member 21 which carries the load lifting mechanism 34 is movable reciprocally relative to the body unit between the sides 19 and 20 thereof.

The load lifting mechanism 34 includes an upright assembly 35 and a load carriage 36 mounted for vertical movement on the upright assembly. The upright assembly 25 includes movable or secondary uprights 37 which are mounted on suitable rollers 38 and 39 and are movable vertically relative to the fixed or primary uprights 40 by actuation of rams 41 and 42 which engage the transverse member 43 extending between the upper ends of the movable uprights.

As shown in FIGS. 1 and 3 the upper ends of the movable uprights 37 are provided with sprockets 44 each having a chain 45 extending around the sprocket with one end connected to the support member 21 with the other end of the chain connected to the load carriage 36.

The load carriage 36 includes a rigid upper frame 46 surrounding the upright assembly 35 and is conveniently mounted for vertical movement relative to the the secondary uprights 37 by means of rollers 47 and 48 which are secured to the transverse plates 49 of the frame 46. The plates 50 and the plates 49 thus interconnect depending legs 51 and 52. A pair of forks 53 are situated on one side of the uprights and a pair of load forks 54 are situated on the opposite side of the uprights. All of the load fork members 53 and 54 are pivotally attached at 55 to the lower extremity of the legs 51 and 52. Thus, the load carriage is constructed symmetrically with the uprights and the frame members thereof surrounding the upright assembly 35. Although pairs of forks are shown as the preferred embodiment of the load carriage, it is to be understood that other load engaging members may be used such as, for example, vacuum pads which would extend across the face of the legs 51 and 52. Obviously in order to use vacuum pads or like load engaging members the load carriage would be raised above the level of plate 17 before the load carriage is moved from one end of the body unit toward the center portion thereof so that the load engaging member and the load itself would clear the body unit.

In the embodiment of the invention shown, an operator rider platform 56 is secured to the carriage member 21 by a connecting member 57 and is supported by wheels 58. The operator platform 56 may include the usual controls for operating the truck and since the platform moves with the uprights as a load is being manipulated, the operator is in a fixed position relative to the load engaging members or forks so that an operator has optimum visibility while a load is being manipulated.

In utilizing the truck to pick up a pallet supported load positioned along a narrow aisle, a truck is moved along the aisle in a position along side the load. The load carriage 36 is then elevated by operation of the lifting rams as necessary to bring the forks into vertical alignment with the pallet of the load. The uprights and load carriage are then moved transversely of the truck body to extend the forks from the side of the truck into the pallet. The rams 41 and 42 are then operated to raise the pallet slightly and the motor 33 operated to retract the forks and the pallet supported load to a position over the truck body. The load carriage is then lowered to improve the stability of the truck and the load transported by the truck to a desired location. The truck may be similarly utilized to deposit a pallet supported load along the side of a narrow aisle.

From the preceding description, it can be seen that there is provided an improved construction for a side lift truck in which the load carriage may be substantially the full width of the truck. Further, a load carriage or forks are provided at both sides of the uprights to permit a load to be picked up and deposited with respect to the opposed sides of the truck without turning or maneuvering the truck.

While one form of the invention has been shown and described, it will be appreciated that this is for the purpose of illustration only and that changes and modifications can be made therein without departing from the scope of the invention.

I now claim:

1. An industrial truck of the character described comprising a wheel supported body unit having an unobstructed top surface, front, rear, and opposed side surfaces, said front and rear surfaces having a greater horizontal dimension than said opposed side surfaces, a pair of uprights straddling said front and rear surfaces, carriage means rigidly interconnecting said uprights and mounting said uprights on said body for linear movement parallel to said front and rear surfaces and movable from one side edge to the other side edge of the top surface of said body, said carriage means straddling said front and rear surfaces, a pair of load lifting devices, one at each side of said uprights, movable vertically relative to said uprights for engaging a load at either of the said opposite side surfaces of said body, and means for raising and lowering said lifting device while said carriage is at any position along said body.

2. An industrial truck as claimed in claim 1 in which said lifting device includes a vertically positioned inverted U-shaped frame the legs of which straddle said body unit.

3. An industrial truck as claimed in claim 1 in which said lifting devices each include a pair of horizontal lifting forks which are pivotably movable into an inoperative vertical position parallel to the uprights.

4. An industrial truck as claimed in claim 1 in which an operator supporting platform is attached to and movable with said carriage means.

5. An industrial truck comprising a wheel mounted body unit having an unobstructed top surface, a pair of uprights, a carriage for said uprights, means mounting said carriage for linear movement parallel to the plane of said top surface from one edge to the other edge of said body unit, a lifting device movable vertically relative to said uprights for engaging a load, means for raising and lowering said lifting device while said carriage is at any position along said body unit, said lifting device including a vertically positioned U-shaped frame at each side of said upright, the legs of which straddle said body unit, and frame members outwardly of said uprights which interconnect said U-shaped frames.

6. An industrial truck as claimed in claim 5 in which said legs of said pair of U-shaped frames include horizontal lifting forks pivotably movable into an inoperative position.

7. An industrial truck as claimed in claim 5 having an operator supporting platform attached to and movable with said carriage.

8. An industrial truck as claimed in claim 5 in which said carriage mounting means is moved by flexible drive means connected to said carriage and extending endlessly around a rotatable means at each end of said body unit and means for driving said rotatable means in opposite directions.

References Cited

UNITED STATES PATENTS

| | | | |
|---|---|---|---|
| 3,031,091 | 4/1962 | Erickson et al. | 214—75 |
| 3,092,268 | 6/1963 | Powers | 214—670 |
| 3,119,506 | 1/1964 | Bridge et al. | 214—670 |
| 3,231,109 | 1/1966 | Bengel et al. | 214—670 |
| 3,235,105 | 2/1966 | Loomis | 214—75 |

FOREIGN PATENTS 927,867   6/1963   England.

GERALD M. FORLENZA, Primary Examiner.

R. J. SPAR, Assistant Examiner.

U.S. Cl. X.R.

214—75